United States Patent [19]
Tamai et al.

[11] Patent Number: 5,400,655
[45] Date of Patent: Mar. 28, 1995

[54] PRESSURE MEASURING APPARATUS

[75] Inventors: Mitsuru Tamai; Hironobu Yao; Masao Saitoh, all of Kanagawa, Japan

[73] Assignee: Fuji Electric Co., Ltd., Kanagawa, Japan

[21] Appl. No.: 863,113

[22] Filed: Apr. 3, 1992

[30] Foreign Application Priority Data

Jul. 4, 1991 [JP] Japan .................. 3-163171

[51] Int. Cl.$^6$ ............................. G01L 7/08
[52] U.S. Cl. ........................ 73/706; 73/715; 92/103 M
[58] Field of Search .............. 73/715, 716, 717, 719, 73/720, 721, 722, 723, 724, 725, 726, 727, 728, 756, 706; 361/283; 338/4; 29/621.1, 25.41; 92/103 SD, 103 M

[56] References Cited

U.S. PATENT DOCUMENTS

| | | | |
|---|---|---|---|
| 4,498,070 | 2/1985 | Lirman | 29/621.1 |
| 4,837,068 | 6/1989 | Martin et al. | 92/103 M |
| 4,920,972 | 5/1990 | Frank et al. | 73/706 |
| 4,970,487 | 11/1990 | Tsukahara et al. | 29/621.1 |

FOREIGN PATENT DOCUMENTS

| | | |
|---|---|---|
| 3121799 | 12/1982 | Germany . |
| 264758 | 2/1989 | Germany . |
| 59-224534 | 12/1984 | Japan . |
| 61-40558 | 2/1986 | Japan . |
| 61-194326 | 8/1986 | Japan . |
| 3-186754 | 8/1991 | Japan . |
| 2118724 | 11/1983 | United Kingdom . |

OTHER PUBLICATIONS

Communication from European Patent Office dated Oct. 12, 1993 with attached European Search Report.

*Primary Examiner*—Donald Woodiel
*Attorney, Agent, or Firm*—Finnegan, Henderson, Farabow, Garrett & Dunner

[57] ABSTRACT

A pressure measuring apparatus comprising a seal diaphragm that separates a fluid to be measured from a pressure transmitting medium that transmits a pressure variation of the fluid to be measured to a pressure detecting section. In such an apparatus, a non-electrically conductive film is coated on a surface of the seal diaphragm which is on the side of the fluid to be measured. As a result of the above construction, the pressure can be measured accurately over a long period of time while preventing hydrogen from passing through the seal diaphragm surely and protecting the seal diaphragm.

7 Claims, 2 Drawing Sheets

PRESSURE MEASURING APPARATUS

BACKGROUND OF THE INVENTION

The invention relates to a pressure measuring apparatus, and more particularly, to an improvement of the surface structure of a seal diaphragm that separates a fluid to be measured from a pressure transmitting medium.

FIG. 6 is a sectional view illustrative of a construction of a generally used conventional pressure measuring apparatus.

As shown in FIG. 6, this conventional apparatus consists mainly of a detecting section 20 and a protecting section 30, and these sections are connected to each other through connecting pipes 16, 17. The detecting section 20 converts a pressure variation (differential pressure) of a fluid to be measured into an electric signal and outputs such electric signal. The protecting section 30, as will be described later, performs the function of protecting the detecting section 20 from excessively applied pressures.

Although some pressure measuring apparatuses are designed so that the detecting section 20 are arranged inside the protecting section 30, a pressure measuring apparatus having the detecting section 20 arranged outside the protecting section 30 as in FIG. 6 is advantageous in that the detecting section 20 is not affected by the temperature of the fluid to be measured even if the fluid to be measured is hot.

The protecting section 30 includes: bodies 31, 32; a protecting diaphragm 13; a seal diaphragm 10; an O ring 18; a cover 19; and a connecting pipe 23. Here, the bodies 31, 32 interpose the protecting diaphragm 13 therebetween on both the right and left side in FIG. 6, and connected to each other at the outer circumference or edge portions. The O ring 18, the cover 19, the connecting pipe 23, and the seal diaphragm 10 are provided in pair.

Also, on the bodies 31, 32 are recessed portions 11, 21, holes 14, 24, and holes 45, 55 formed so as to be symmetrical to each other. The recessed portion 11 is formed in conical form on the left side end of the body 31 so as to be coaxial with the body 31, the hole 14 passes through the body 31 along the line of axis, the hole 45 is opened in the vicinity of the outer circumference of the recessed portion 11 on one end, and it communicates with a not shown connecting space within the detecting section 20 while passing through the connecting pipe 16. The body 31 is formed into a wavy section on its right side end, and the seal diaphragm 10 having substantially the same wavy pattern is firmly secured to its edge portion so as to form a space with its right side end. The cover 19 is mounted on the right side of the body 31 through the O ring 18 that is disposed at the outer circumference further outward from the seal diaphragm 10. The connecting pipe 23 is connected to this cover 19.

The body 32 on the left side is constructed substantially in the same way, and silicone oil (a sealing fluid) serving as a pressure transmitting medium is loaded into the space that is in contact with the seal diaphragm 10 and into the spaces formed of holes 14, 24, recessed portions 11, 21, and holes 45, 55.

In the thus constructed pressure measuring apparatus, part of the fluid to be measured passes through the seal diaphragm 10, infiltrates into the silicone oil that serves as the pressure transmitting medium, and resides therein in the form of hydrogen gas, thus making accurate pressure measurement impossible. In some extreme case, there may be the risk of making pressure detection totally impossible.

[Case 1]

A first case satisfies the following conditions.
(1) A fluid to be measured is an electrically conductive neutral aqueous solution, whose temperature is relatively high (e.g., 80° C.); and
(2) The cover, the connecting pipe, and the like are made of a metallic material whose ionization tendency is greater than that of the seal diaphragm (e.g., the cover and the connecting pipe are made of an iron-containing alloy, and the seal diaphragm is made of a corrosion resistant steel).

The mechanism of infiltration and residence of hydrogen toward the silicone oil in this case may generally be inferred as follows.

$$M \rightarrow M^{2+} + 2e \quad (1)$$

$$O_2 + 2H_2O + 4e^- \rightarrow 4OH^- \quad (2)$$

$$2H^+ + 2e^- \rightarrow 2H \quad (3)$$

$$2H \rightarrow H_2 \quad (4)$$

More specifically, when the metal forming the cover 19 and the connecting pipe 23 has a greater ionization tendency (electrically base) than the metal forming the seal diaphragm 10, the metal (M) forming the cover 19 and the connecting pipe 23 emits electron while eluted into the fluid to be measured as indicated by equation (1).

Here, the fluid to be measured is substantially neutral and the concentration of its hydrogen ion is low. It is the reaction expressed by equation (2) rather than by equation (3) or (4) that mainly takes place as an initial reaction.

However, oxygen that is present in the fluid to be measured within the space surrounded by the cover 19 and the seal diaphragm 10 is only consumed as the reaction expressed by equation (2) proceeds and not replenished from outside. With the fluid within the space being resident, it is the reaction based on equation (3) that mainly takes place afterwards.

Once the reaction expressed by equation (3) has occurred on the seal diaphragm 10 side, the majority of hydrogen atoms adsorbed onto its surface form a hydrogen molecule as indicated by equation (4) to thereby produce a hydrogen gas. The hydrogen gas cannot pass through the seal diaphragm 10 because of the magnitude of its molecule. However, part of the hydrogen atoms becomes diffused in the seal diaphragm 10 during the reaction expressed by equation (3), i.e., in the state of hydrogen atoms, infiltrates into the silicone oil, and resides within the detecting section 20 in the form of hydrogen gas.

The above is the case where hydrogen present in the fluid to be measured (the aqueous solution) permeates the seal diaphragm.

[Case 2]

On the other hand, even when a fluid to be measured (a gas) contains large amounts of hydrogen, the hydrogen gas resides inside the detecting section 20 of the pressure measuring apparatus.

The mechanism of infiltration and residence of the hydrogen gas into the silicon coil may generally be inferred as follows.

  (3)'

  (4)

More specifically, a hydrogen molecule within the hydrogen gas becomes dissociated on the surface of a metal as indicated by equation (3)', causing itself to be adsorbed onto the surface of the seal diaphragm 10. Then, such hydrogen passes through the seal diaphragm 10 in the state of hydrogen atoms and resides in the silicone oil in the form of hydrogen gas as indicated by equation (4).

SUMMARY OF THE INVENTION

The invention has been made in view of the above circumstances. Accordingly, an object of the invention is to provide a pressure measuring apparatus capable of measuring the pressure accurately over a long period of time by preventing hydrogen from permeating the seal diaphragm surely and protecting the seal diaphragm.

To achieve the above object, a first aspect of the invention is applied to a pressure measuring apparatus comprising a seal diaphragm separating a fluid to be measured from a pressure transmitting medium transmitting a pressure variation of the fluid to be measured to a pressure detecting section. In such a pressure measuring apparatus, a non-electrically conductive film is coated on a surface of the seal diaphragm, the surface being on the side of the fluid to be measured.

A second aspect of the invention is applied to a pressure measuring apparatus, in which a plurality of nonelectrically conductive films are coated on the seal diaphragm surface which is on the side of the fluid to be measured.

A third aspect of the invention is applied to a pressure measuring apparatus, in which a first non-electrically conductive film and a second non-electrically conductive film are coated while sequentially stacked on the seal diaphragm surface on the side of the fluid to be measured so that the first non-electrically conductive film comes in contact with the fluid to be measured, the first non-electrically conductive film being made of a material being corrosion resistant to the fluid to be measured, and the second non-electrically conductive film being made of a material exhibiting good contacting property with respect to both the first nonelectrically conductive film and a mother material of the seal diaphragm.

A fourth aspect of the invention is applied to a pressure measuring apparatus, in which a non-electrically conductive film and a hydrogen diffusion blocking film are coated while sequentially stacked on the seal diaphragm surface on the side of the fluid to be measured so that the non-electrically conductive film comes in contact with the fluid to be measured, the hydrogen diffusion blocking film being made of a metallic material into which hydrogen is hard to diffuse.

A fifth aspect of the invention is applied to a pressure measuring apparatus according to the fourth aspect, in which the hydrogen diffusion blocking film is made of gold or tungsten.

A sixth aspect of the invention is applied to a pressure measuring apparatus according to one of the first through fifth aspects, in which the non-electrically conductive film is made of ceramics.

A seventh aspect of the invention is applied to a pressure measuring apparatus comprising: a seal diaphragm for separating a fluid to be measured from a pressure transmitting medium transmitting a pressure variation of the fluid to be measured to a pressure detecting section; a cover for covering the seal diaphragm from outside and thereby forming a pressure introducing space with the seal diaphragm; and a connecting pipe for allowing both the pressure introducing space and a path through which the fluid to be measured flows to be communicated with each other. In such a pressure measuring apparatus, a non-electrically conductive film is coated on a surface of the seal diaphragm which is on the side of the fluid to be measured and a corrosion resistant resin material is coated on inner surfaces of the cover and the connecting pipe.

An eighth aspect of the invention is applied to a pressure measuring apparatus according to the seventh aspect, in which the corrosion resistant resin material is tetrafluoroethylene.

The pressure measuring apparatus according to the first aspect of the invention prevents electrochemical reactions from taking place on the seal diaphragm surface on the side of the fluid to be measured by the non-electrically conductive film. That is, delivery of the electrons from the seal diaphragm to the hydrogen ion is hard to occur, thereby making it difficult to cause the hydrogen atoms to adhere to or permeate the seal diaphragm. Further, it prevents the hydrogen molecules from coming in direct contact with the surface of the metal, thereby obviating dissociation of the hydrogen molecules into hydrogen atoms. Accordingly, the hydrogen gas is hard to reside in the pressure transmitting medium (the silicone oil) even if the fluid to be measured is a neutral aqueous solution or a gas including hydrogen gas.

In the pressure measuring apparatus of the second aspect of the invention, delivery of the electrons from the seal diaphragm to the hydrogen ion is harder to take place, thereby making it more difficult to cause the hydrogen atoms to adhere to or pass through the seal diaphragm.

In the pressure measuring apparatus of the third aspect of the invention, the first non-electrically conductive film coated on the uppermost surface hardly allows the electrons to be delivered from the seal diaphragm to the hydrogen ion, thereby making it difficult to cause the hydrogen atoms to adhere to or permeate the seal diaphragm. In addition, the first non-electrically conductive film is corrosion resistant to the fluid to be measured. The second non-electrically conductive film in the middle not only encourages blocking of adhesion and permeation of the hydrogen atoms, but also provides bonding strength between the first non-electrically conductive film and the seal diaphragm.

In the pressure measuring apparatus of the fourth aspect of the invention, the non-electrically conductive film coated on the outermost surface makes delivery of the electrons from the seal diaphragm to the hydrogen ion hard to take place, thereby making it difficult to cause the hydrogen atoms to adhere to or pass through the seal diaphragm. In addition the hydrogen diffusion blocking film coated on the mother material of the seal diaphragm in the middle promotes blocking of adhesion or permeation of the hydrogen atoms.

In the pressure measuring apparatus of the seventh aspect of the invention, the cover is coated with a corrosion resistant resin, such as tetrafluoroethylene resin, on the surface that comes in contact with the fluid to be measured. As a result, the apparatus is provided with the features of not only having corrosion resistance to the fluid to be measured, but also preventing residence of hydrogen gas within the detecting section doubly.

DETAILED DESCRIPTION OF THE PREFERRED EMBODIMENTS

Figure 1:
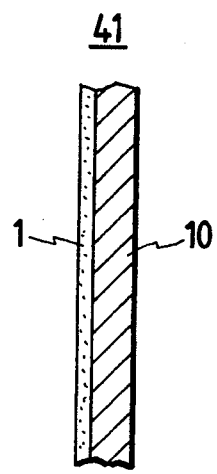
FIG. 1 is a sectional view showing a main portion of a first embodiment of the invention.

A variety of embodiments of the invention will now be described with reference to the accompanying drawings. FIG. 1 is a sectional view showing a main portion of a first embodiment of the invention, i.e., a seal diaphragm with film 41. In FIG. 1, a ceramic film 1 of several $\mu$m thick as a non-electrically conductive film is coated on the left surface of a seal diaphragm 10, i.e., the surface on the side of a fluid. The seal diaphragm 10 is depicted linearly instead of in wavy form.

As a result of this ceramic film 1, delivery of electrons from the seal diaphragm 10 to the hydrogen ion such as shown in equation (3) is hard to take place or never takes place at all, thus blocking the hydrogen atoms from adhering to or passing through the seal diaphragm. Even if the ceramic film 1 is not in perfect conditions; e.g., some pinholes or cracks are present thereon, generation of hydrogen atoms can be blocked.

Figure 2:
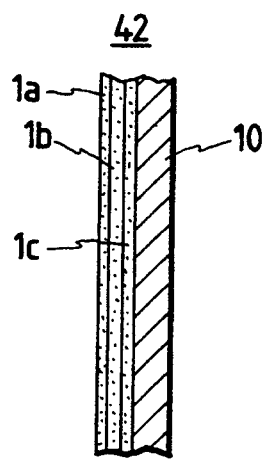
FIG. 2 is a sectional view showing a main portion of a second embodiment of the invention.

FIG. 2 is a sectional view showing a main portion of a second embodiment, which is a seal diaphragm with film 42. In FIG. 2, three layers of ceramic films 1a, 1b, 1c are coated on the left surface of the seal diaphragm 10, i.e., the surface on the fluid side. As a result of the three-layered ceramic film structure, delivery of the electrons from the seal diaphragm 10 to the hydrogen ion is harder to take place than in the first embodiment, thereby making it more difficult to cause the hydrogen atoms to adhere to or permeate the seal diaphragm.

Figure 3:
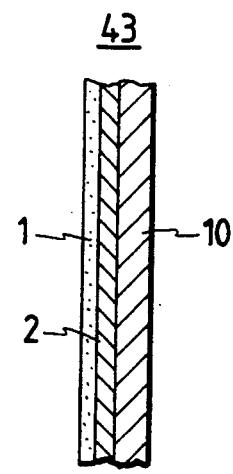
FIG. 3 is a sectional view showing a main portion of a third embodiment of the invention.

FIG. 3 is a sectional view of a main portion of a third embodiment, which is a seal diaphragm with film 43. In FIG. 3, two layers of ceramic films 1, 2 are coated on the left surface of the seal diaphragm 10, i.e., the surface on the fluid side. Here, while the ceramic film 1 is the same as in the first embodiment, the ceramic film 2 is interposed between the seal diaphragm 10 and the ceramic film 1 and has a large bonding strength with respect to each of them, thus allowing the ceramic film 1 to be bonded sufficiently with the seal diaphragm 10. The ceramic film 2 is a ceramic film including, e.g., a titanium oxide or carbon. In this third embodiment, the action of blocking the generation of hydrogen atoms is, of course, exhibited in a manner similar to that in the first embodiment.

When a 3 $\mu$m-thick $Al_2O_3$ film is used as each of the ceramic films 1, 2 in the third embodiment, the effect of coating was verified in comparison with a diaphragm with no coating. As an item of comparison, time required for a pressure detector output drift to reach 0.5% under acceleration test conditions was selected. Compared with 40 to 50 hours in the noncoated example, even after the elapse of 1000 hours no drift was observed in the output of the third embodiment, attesting to the excellent effect exhibited by the embodiment of the invention. Other than the above, ceramic films such as $SiO_2$, $AlN$, $Si_3N_4$, and $SiC$ may also be used.

Figure 4:
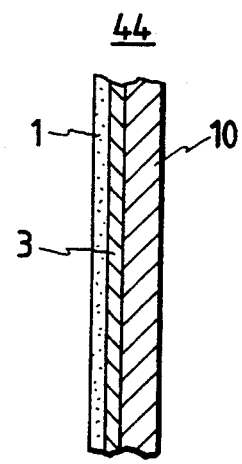
FIG. 4 is a sectional view showing a main portion of a fourth embodiment of the invention.

FIG. 4 is a sectional diagram showing a main portion of a fourth embodiment, i.e., a seal diaphragm with film In FIG. 4, a ceramic film 1 and a hydrogen diffusion blocking film 3 are coated in two layers on the left surface of the seal diaphragm 10, i.e., the surface on the fluid side. Here, the ceramic film 1 is the same as in the first embodiment. The hydrogen diffusion blocking film 3 is made of a material into which hydrogen is hard to diffuse or into which hydrogen does not diffuse, such as gold or tungsten.

In the fourth embodiment, the ceramic film 1 coated on the uppermost surface hardly allows the electrons to be delivered from the seal diaphragm 10 to the hydrogen ion, thus making it difficult for the hydrogen atoms to adhere to or pass through the seal diaphragm. The hydrogen diffusion blocking film 3 encourages blocking of the hydrogen atoms from adhering to or passing through the seal diaphragm 10.

Figure 5:
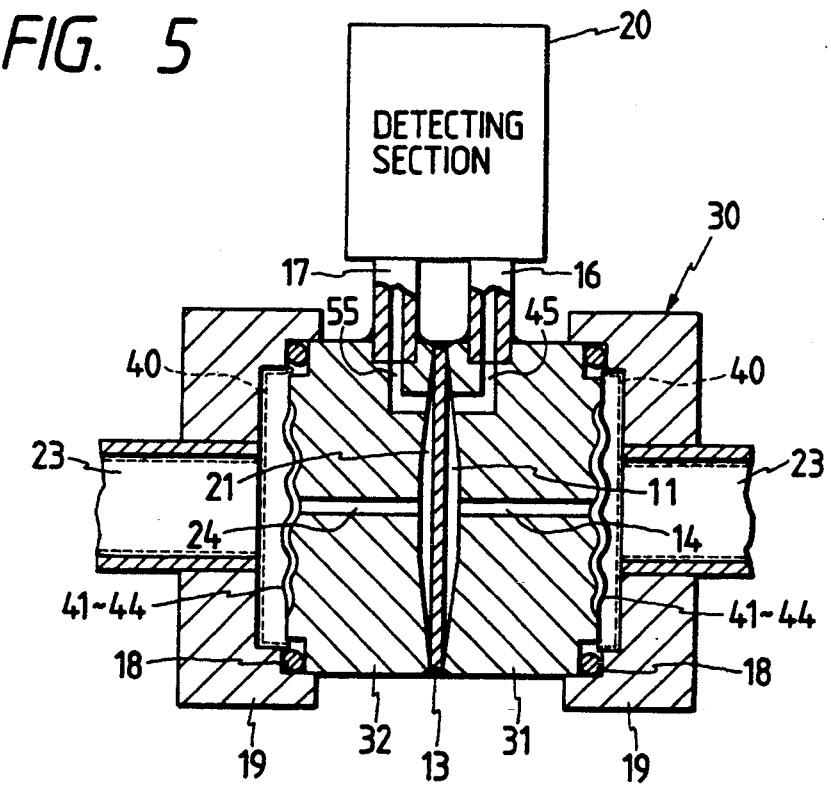
FIG. 5 is a sectional view common to the first to fourth embodiments.
Figure 6:
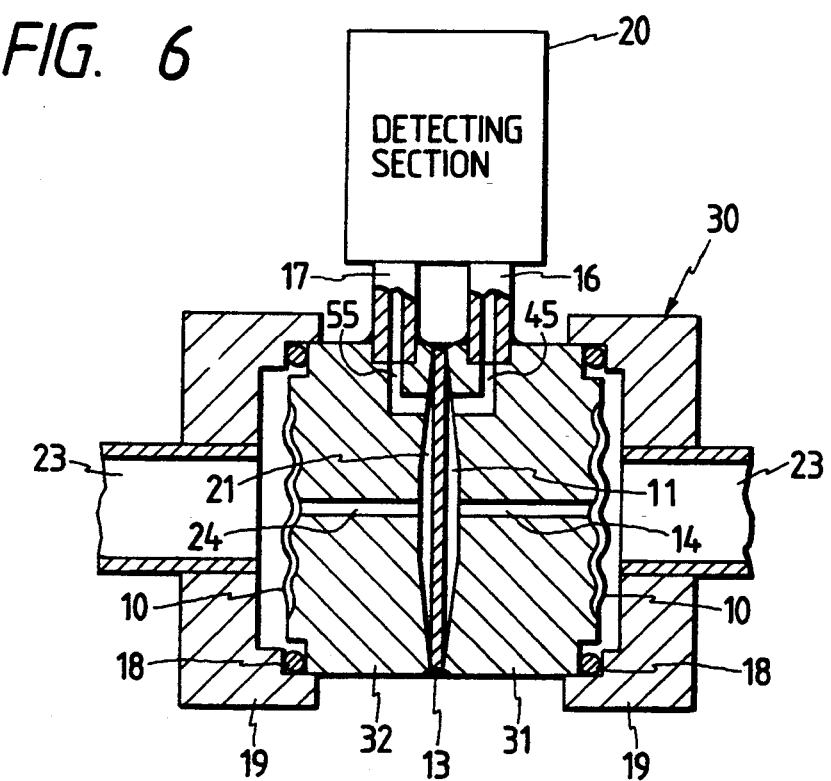
FIG. 6 is a sectional view of a conventional example.

FIG. 5 is a sectional view common to the respective embodiments. In FIG. 5, each of the above-mentioned seal diaphragms with film 41, 42, 43, 44 is provided as a seal diaphragm, and tetrafluoroethylene resin as a corrosion resistant resin is coated on the inner surfaces of a cover 19 and a connecting pipe 23. A film 40 indicated in broken line is this tetrafluoroethylene coating. The tetrafluoroethylene resin is known as "Teflon" (trademark of Du Pont) and is a chemically very stable substance. It is resistant to any chemicals other than molten alkali metal and high-temperature fluorine gas. It also exhibits excellent heat resistance and cold resistance (operating temperatures from $-100°$ to $+260°$ C.). Thus, the tetrafluoroethylene resin is optimal as a material for coating the inner surface of the cover.

In the pressure measuring apparatus of the invention, the coated non-electrically conductive film hardly allows electrons to be delivered from the seal diaphragm to the hydrogen ion, thereby making it also difficult to cause the hydrogen atoms from adhering to or passing through the seal diaphragm. As a result, infiltration of the hydrogen gas into the pressure transmitting medium is prevented, hence ensuring accurate pressure measurement.

Further, in the pressure measuring apparatus of the invention, the plurality of coated non-electrically conductive films make delivery of the electrons from the seal diaphragm to the hydrogen ion harder to take place, thereby making it also more difficult to cause the hydrogen atoms to adhere to or pass through the seal diaphragm. As a result, infiltration of the hydrogen gas into the pressure transmitting medium is further prevented, hence ensuring more accurate pressure measurement.

Still further, in the pressure measuring apparatus of the invention, the first non-electrically conductive film coated on the uppermost surface hardly allows the electrons to be delivered from the seal diaphragm to the hydrogen ion, thus making it also difficult to cause the hydrogen atoms to adhere to or pass through the seal diaphragm. In addition, the first non-electrically conductive film is corrosion resistant to the fluid. Also, the second non-electrically conductive film in the middle not only encourages blocking of adhesion or permeation of the hydrogen atoms, but also provides bonding strength with respect to both the first non-electrically conductive film and the seal diaphragm. As a result, not only infiltration of the hydrogen gas into the pressure transmitting medium can be blocked more surely, thus ensuring more accurate pressure measurement, but also reliability derived from the bonding strength between the first non-electrically conductive film and the seal diaphragm can be improved.

Still further, in the pressure measuring apparatus of the invention, the non-electrically conductive film coated on the uppermost surface hardly allows the electrons to be delivered from the seal diaphragm to the hydrogen ion, thus making it also difficult to cause the hydrogen atoms to adhere to or pass through the seal diaphragm. Also, the hydrogen diffusion blocking film coated on the mother material of the seal diaphragm in the middle encourages blocking of adhesion or permeation of the hydrogen atoms. As a result, infiltration of the hydrogen gas into the pressure transmitting medium can be blocked more surely, thus ensuring more accurate pressure measurement.

Still further, in the pressure measuring apparatus of the invention, the cover is coated with a corrosion resistant resin, e.g., tetrafluoroethylene resin, on the surface that comes in contact with the fluid to be measured. As a result, the pressure measuring apparatus is provided not only with corrosion resistance to the fluid to be measured, but also with such advantages as a reduction in the number of component manufacturing steps as well as a cost reduction. In addition, infiltration of the hydrogen gas into the pressure transmitting medium can be blocked doubly, thereby ensuring more accurate pressure measurement.

What is claimed is:

1. An apparatus for measuring pressure in a first fluid, comprising:
    a second fluid contained in the apparatus for transmitting a pressure variation of the first fluid to a pressure detecting section;
    a seal diaphragm for separating the first fluid from the second fluid; and
    a first non-electrically conductive film cleaved to a surface of said seal diaphragm, said first non-electrically conductive film and said surface being on the side of said first fluid.

2. The apparatus of claim 1, wherein the first non-electrically conductive film is coated on the seal diaphragm surface.

3. An apparatus for measuring pressure in a first fluid, comprising:
    a second fluid contained in the apparatus for transmitting a pressure variation of the first fluid to a pressure detecting section;
    a seal diaphragm for separating the first fluid from the second fluid; and
    a first non-electrically conductive film connected to a surface of said seal diaphragm, said first non-electrically conductive film and said surface being on the side of said first fluid, wherein a plurality of non-electrically conductive films are coated on said seal diaphragm surface on the side of said first fluid.

4. An apparatus for measuring pressure in a first fluid, comprising:
    a second fluid contained in the apparatus for transmitting a pressure variation of the first fluid to a pressure detecting section;
    a seal diaphragm for separating the first fluid from the second fluid;
    a first non-electrically conductive film connected to a surface of said seal, diaphragm, said first non-electrically conductive film and said surface being on the side of said first fluid; and
    a second non-electrically conductive film positioned between said first non-electrically conductive film and said seal diaphragm surface so that said first non-electrically conductive film comes in contact with said first fluid, said first non-electrically conductive film being made of a material that resists corrosion caused by said first fluid and said second non-electrically conductive film being made of a material having good contact property to both said first non-electrically conductive film and said seal diaphragm.

5. An apparatus for measuring pressure in a first fluid, comprising:
    a second fluid contained in the apparatus for transmitting a pressure variation of the first fluid to a pressure detecting section;
    a seal diaphragm for separating the first fluid from the second fluid;
    a first non-electrically conductive film connected to a surface of said seal diaphragm, said first non-electrically conductive film and said surface being on the side of said first fluid; and
    a hydrogen diffusion blocking film, positioned between said first non-electrically conductive film and said seal diaphragm surface so that said non-electrically conductive film comes in contact with said first fluid, said hydrogen diffusion blocking film being made of a metallic material into which hydrogen does not easily diffuse.

6. The apparatus of claim 5, wherein said hydrogen diffusion blocking film includes gold or tungsten.

7. An apparatus for measuring pressure in a first fluid, comprising:
    a second fluid contained in the apparatus for transmitting a pressure variation of the first fluid to a pressure detecting section;
    a seal diaphragm for separating the first fluid from the second fluid; and
    a first non-electrically conductive film connected to a surface of said seal diaphragm, said first non-electrically conductive film and said surface being on the side of said first fluid, wherein said first non-electrically conductive film includes ceramics.

* * * * *